United States Patent
Hwang

(10) Patent No.: US 8,287,158 B2
(45) Date of Patent: Oct. 16, 2012

(54) COVER PLATE FOR LIGHTING FIXTURE AND LIGHTING FIXTURE HAVING THE SAME

(75) Inventor: Cheon Nam Hwang, Paju-si (KR)

(73) Assignee: GL Korea Co., Ltd., Goyang (KR)

( * ) Notice: Subject to any disclaimer, the term of this patent is extended or adjusted under 35 U.S.C. 154(b) by 466 days.

(21) Appl. No.: 12/445,098

(22) PCT Filed: Oct. 23, 2007

(86) PCT No.: PCT/KR2007/005191
§ 371 (c)(1),
(2), (4) Date: Apr. 10, 2009

(87) PCT Pub. No.: WO2008/054085
PCT Pub. Date: May 8, 2008

(65) Prior Publication Data
US 2010/0031544 A1  Feb. 11, 2010

(30) Foreign Application Priority Data

Oct. 30, 2006 (KR) .................. 10-2006-0105388
Feb. 21, 2007 (KR) .................. 10-2007-0017218

(51) Int. Cl.
*F21V 3/00* (2006.01)
(52) U.S. Cl. .................. 362/311.01; 362/97.1; 362/355; 362/330; 349/64; 349/62
(58) Field of Classification Search .................. 362/355, 362/97.1, 97.4, 311.01–311.05; 349/64, 349/62
See application file for complete search history.

(56) References Cited

U.S. PATENT DOCUMENTS

| | | | |
|---|---|---|---|
| 7,401,967 B2 * | 7/2008 | Wei et al. | 362/626 |
| 7,569,257 B2 * | 8/2009 | Ha et al. | 428/1.1 |
| 7,776,424 B2 * | 8/2010 | Chuang et al. | 428/172 |
| 7,806,545 B2 * | 10/2010 | Hsu et al. | 362/97.2 |
| 2005/0052885 A1 * | 3/2005 | Wu | 362/565 |
| 2007/0019419 A1 * | 1/2007 | Hafuka et al. | 362/373 |

(Continued)

FOREIGN PATENT DOCUMENTS

JP  08-160417 A  6/1996

(Continued)

OTHER PUBLICATIONS

International Search Report for PCT/KR2007/005191.

(Continued)

*Primary Examiner* — Robert May
(74) *Attorney, Agent, or Firm* — Justin H. Kim; Maxon IP LLC

(57) ABSTRACT

Disclosed is a cover plate for a lighting fixture and a lighting fixture having the same, which achieves superior light diffusivity and light uniformity as well as superior light transmission in comparison with the prior art, thereby improving a luminance characteristic. The cover plate is arranged at an exterior of an light source of the light fixture so as to exit lighting emitted from the light source outward. The cover plate is made of light transmissive resin material having 5-35% of bubbles for light scattering, which has a diameter within a range of 60 μm~700 μm, and exits light emitted from the light source while diffusing the light to the whole area of the cover plate.

12 Claims, 7 Drawing Sheets

U.S. PATENT DOCUMENTS

2007/0171355 A1* 7/2007 Chung .......................... 349/194
2007/0236939 A1* 10/2007 Ouderkirk et al. ............ 362/339
2008/0117630 A1* 5/2008 Durvasula et al. ............ 362/246

FOREIGN PATENT DOCUMENTS

| JP | 2004-006139 A | 1/2004 |
| JP | 05-000477 A | 4/2009 |
| KR | 10-2004-0024955 A | 3/2004 |

OTHER PUBLICATIONS

Korean Patent Office Action issued on Oct. 25, 2010, 2010 in corresponding China Patent Application No. 2007800403142. (See attached a full English translation).

Mexico Patent Office Action issued on Nov. 4, 2010 in corresponding Mexico Patent Application No. 81194.

* cited by examiner

COVER PLATE FOR LIGHTING FIXTURE AND LIGHTING FIXTURE HAVING THE SAME

TECHNICAL FIELD

The present invention relates to a cover plate for a lighting fixture, and more particularly to a cover plate for a lighting fixture, which is applied to an advertisement fixture such as a billboard, an interior lighting, or a lighting fixture for an interior design, etc. so as to uniformly diffuse light emitted from an light source through all parts of the cover plate, thereby emitting the light at a high light transmission and with a high luminance.

BACKGROUND ART

Various advertisement fixtures, such as advertisement paper, billboards, and luminous advertisement fixtures, have been recently used in advertising products of various companies or various businesses. Such an advertisement fixture uses various kinds of pictures, phrases, photographs, patterns, etc., so as to increase recognition of desired information to be communicated to a purchaser, and particularly, many kinds of advertisement fixtures using a lighting fixture have been developed so as to make it possible to properly communicate desired information to a purchaser at night time or at a place under low illumination.

Generally, such an advertisement fixture using a lighting fixture includes a cover plate having transparent or semitransparent material having light transmission. The cover plate exiting light emitted from an light source, such as a fluorescent lamp or a lighting emitting diode (LED), etc., outward while diffusing the light, and also hides the light source. The cover plate may have a thin film engraved with a picture, a phrase, a pattern, etc. attached to a surface thereof, or may have its own shape of a specific character or a picture, etc.

Also, in addition to an advertisement fixture, a lighting fixture, such as a fluorescent lamp, a stand light, a street light, or a light for an interior design, etc. employs a cover plate.

Most cover plates employed in a typical lighting fixture are generally manufactured by adding polymeric particulates, to which inorganic particles, styrene-based or acryl-based polymeric particles, etc. are partially cross-linked.

However, the conventional cover plate has high specific gravity so that its weight is heavy and much manufacturing cost is required. Also, the conventional cover plate has a superior optical diffusivity, but has a low light transmission, so there is a problem that a luminance-characteristic thereof is generally low.

Particularly, when an advertisement fixture becomes larger, the size of a cover plate employed therein increases and the thickness thereof also increases. However, when the thickness of a cover plate increases as such, the number of corpuscles included therein also increases in proportion to the increases of thickness thereof. Accordingly, light transmission remarkably decreases so that luminance also notably decreases.

DISCLOSURE

Technical Problem

Accordingly, the present invention has been made to solve the above-mentioned problems occurring in the prior art, and the present invention provides a cover plate for a lighting fixture and a lighting fixture using the same, which achieves superior light diffusivity and light uniformity and also has superior light transmission in comparison with a conventional art, thereby improving a luminance-characteristic.

Technical Solution

In accordance with an aspect of the present invention, there is provided a cover plate for a lighting fixture, which is arranged at an exterior of an light source of the lighting fixture so as to exit lighting emitted from the light source outward, wherein the cover plate is made from light transmissive resin material having 5~35% of bubbles for light scattering, so as to diffuse and emit light emitted from an light source through an entire surface of the cover plate.

In accordance with another aspect of the present invention, there is provided a lighting fixture includes: a case; an light source installed at an interior of the case so as to emit light; and a cover plate installed at an outer side of the light source, the cover plate being made from light transmissive resin material including bubbles for light scattering with an inclusion rate of 5~35%, so that the cover plate exits light emitted from the light source while diffusing the light to a whole surface of the cover plate.

Advantageous Effects

According to the present invention as described above, light emitted from an light source of a lighting fixture is scattered and refracted by bubbles of a cover plate so that the light is equally diffused through the whole surface of the cover plate, and is also refracted while being transmitted through the bubbles. Therefore, the degree of decrease of light transmission is minimized so that a superior luminance-characteristic can be provided.

DESCRIPTION OF DRAWINGS

The foregoing and other objects, features and advantages of the present invention will become more apparent from the following detailed description when taken in conjunction with the accompanying drawings in which.

BEST MODE

Hereinafter, exemplary embodiments of a cover plate for a lighting fixture and a lighting fixture using the same according to the present invention will be described in detail with reference to the accompanying drawings.

Although a cover plate for a lighting fixture according to the present invention as described below has a flat square-shape, a cover plate for a lighting fixture according to the present invention may be various shapes, such as a spherical shape, a cylindrical shape, a polyhedron-shape, etc., according to a characteristic of a lighting fixture in which the cover plate is employed.

Also, although a cover plate for a light fixture according to the present invention can be installed in such a manner that the cover plate is exactly arranged at an upper side of an light source of a light fixture or surrounds the light source, a light guide plate exiting light emitted from the light source to a facial light source can be arranged at one side of the light source, and a cover plate can be also installed at an outer side of a light emitting surface of the light guide plate so as to diffuse the light.

Figure 1:
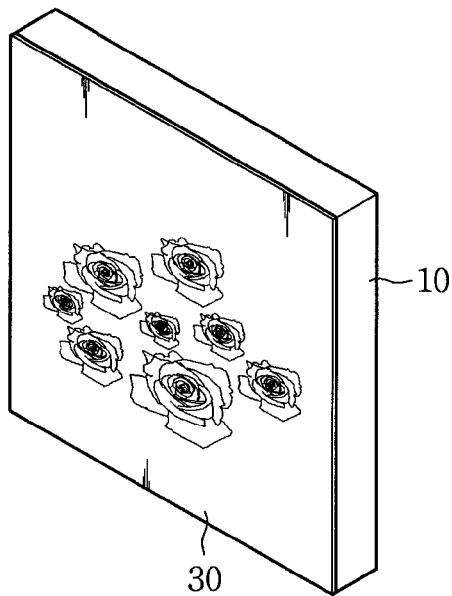
FIG. 1 a perspective view illustrating an advertisement fixture employing a cover plate for a light fixture according to one embodiment of the present invention.
Figure 2:
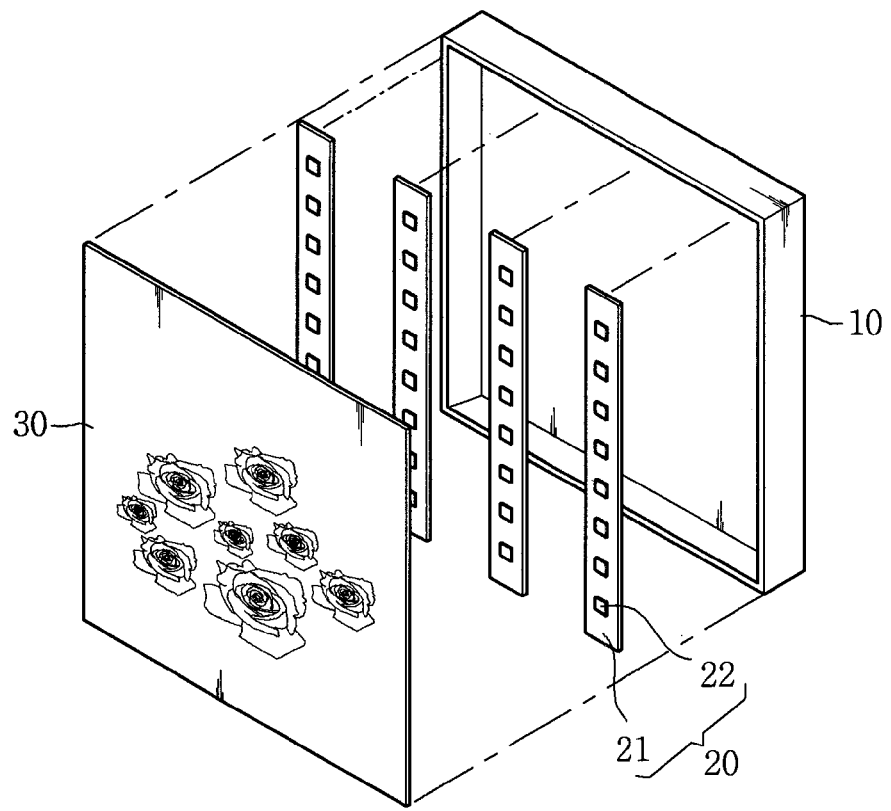
FIG. 2 is an exploded perspective view illustrating the advertisement fixture as shown in FIG. 1.
Figure 3:
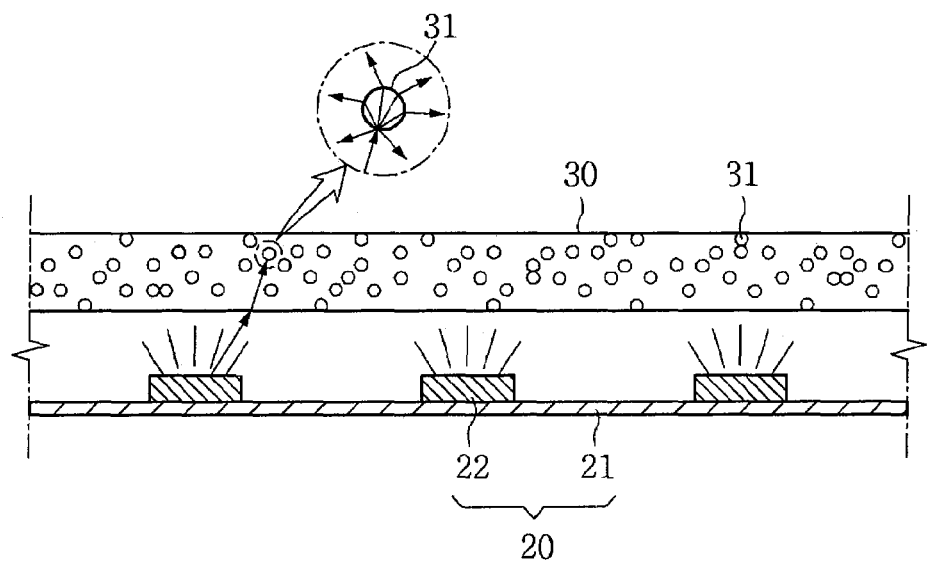
FIG. 3 is a sectional view illustrating the cover plate of the advertisement fixture as shown in FIG. 1 and a main part of an light source, according to one embodiment of the present invention.

FIGS. 1 to 3 are views illustrating an advertisement fixture employing a cover plate for a lighting fixture according to one embodiment of the present invention.

With reference to FIGS. 1 and 2, the advertisement fixture includes a case 10 having one surface opened, an light source 20 installed at the interior of the case 10, and a cover plate 30 assembled with the opened surface of the case 10.

A light emitting surface of the front side of the cover plate 30 may have a film, a cloth, etc. engraved with a predetermined advertisement phrase, a pattern, a picture, etc. attached thereon, or may be coated by paints having a predetermined color.

Although, according to this embodiment, the light source 20 includes at least one circuit board 21 installed at the interior of the case 10 while having a predetermined interval and a plurality of lighting emitting diodes (LED) 22 installed at the circuit board 21 while having a predetermined interval from each other so as to emitting light into a front side of the circuit board 21, additionally, various light sources such as a fluorescent lamp or a neon lamp, etc. may be applied.

The cover plate 30 is an element which hides the light source 20 and also exits light entering the interior while diffusing the light to the whole surface thereof. The cover plate 30 may be made of transparent or semitransparent material having light transmission, such as Polycarbonate (PC), polymethylmethacrylate(PMMA), Methylmethacrylate (MMA), epoxy, Polyethylene Terephthalate(PET), Polyprophylene(pp), ABS resin, etc.

Also, as shown in FIG. 3, countless bubbles 31 for light scattering are formed at the interior of the cover plate 30. The bubbles 31 perform a function for scattering light as well as a function for refracting light passing through the bubbles, differently from typical particles used in the prior art, thereby improving diffusivity and also minimizing decreases of light transmission.

The bubbles 31 may be formed by a foam forming method, such as a foam extrusion method or a foam injection method, etc., when the cover plate 30 is manufactured.

Figure 4:
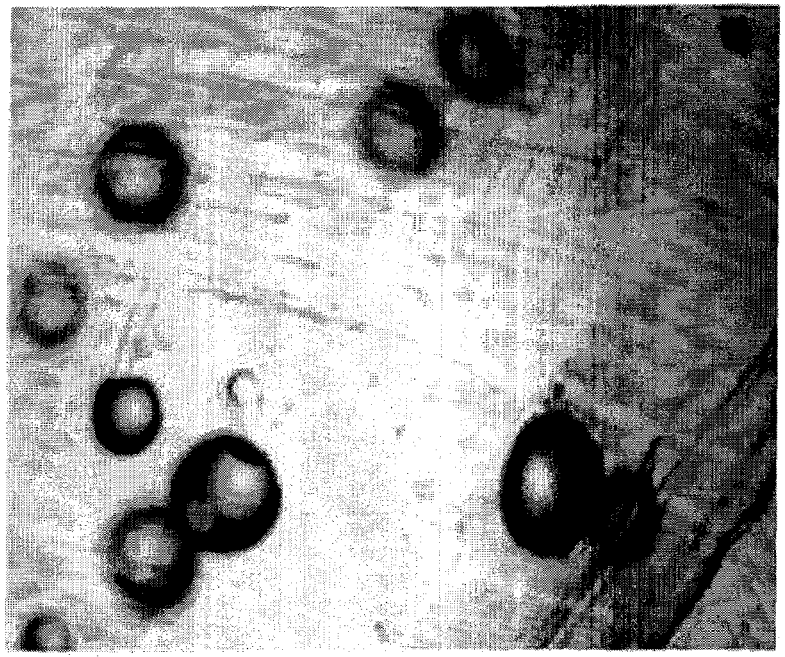
FIG. 4 is a picture photographed by an optical microscope showing a state of bubbles in a case where a bubble inclusion rate of a cover plate is less than 5%.

The number and size (diameter) of bubbles 31 per unit volume, which are formed at the cover plate 30, have to be formed, considering diffusion and transmission. When the number of bubbles 31 per unit volume of the cover plate 30, i.e. inclusion rate is too high (over 35%), light diffusivity is superior, but light transmissivity is lowered, so that brightness decreases, and compression strength and tensile strength due to bubbles remarkably decrease. On the other hand, as shown in FIG. 4, when the inclusion rate of bubbles of the cover plate 30 is too low (under 5%), the degree of light scattering is low so that diffusivity remarkably decreases and the cover plate can not properly perform a diffusion function, and intervals between bubbles are larger so that the light source can be observed by naked eyes. Therefore, the cover plate is not suitable for a lighting fixture, particularly for an advertisement fixture.

Figure 5:
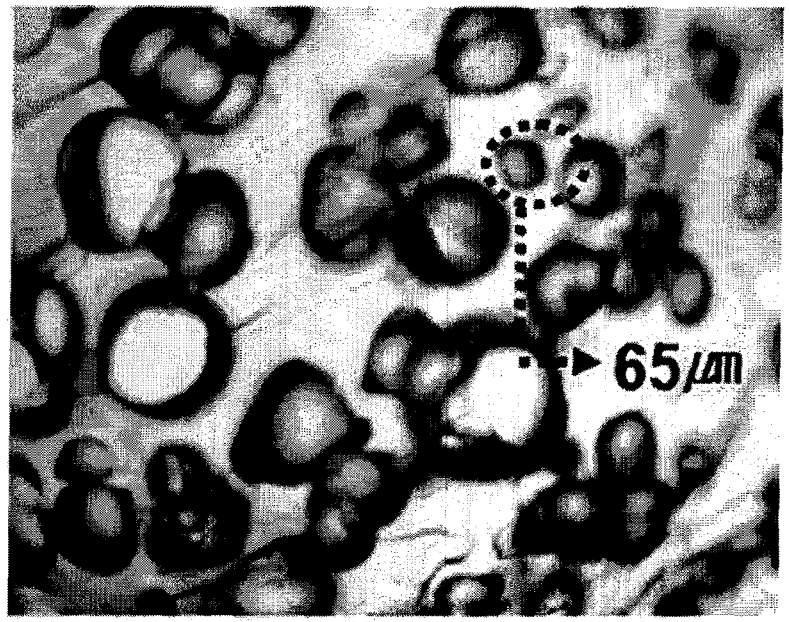
FIG. 5 is a picture photographed by an optical microscope showing a state of a bubble having a diameter of 65 μm among bubbles included in a cover plate.
Figure 6:
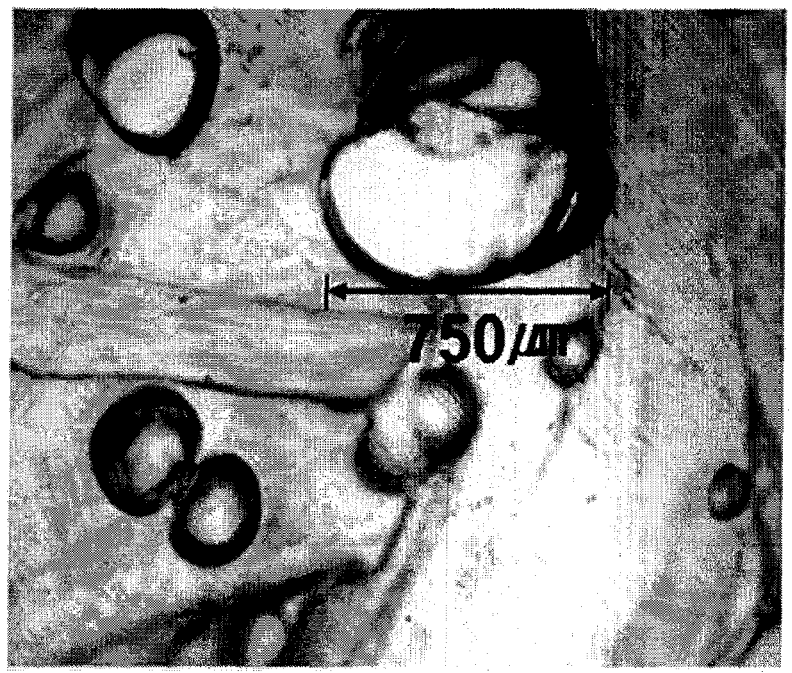
FIG. 6 is a picture photographed by an optical microscope showing a bubble having a diameter of 750 μm among bubbles included in a cover plate.

Also, when the size of bubbles 31 is too small (under 60 μm), light diffusivity is superior, but light transmissivity decreases so that brightness decreases. Also, as shown in FIG. 5, when the cover plate is manufactured, it is very difficult to control the size of bubbles due to mechanical limitations, so that mass production thereof is actually difficult. On the other hand, in a case where the size of bubbles 31 is too big (over 700 μm), although the bubbles has light diffusivity, the direct light transmission area for direct transmission of incident or exiting light per unit bubble increases, so that the light source can be faintly observed by naked eyes (see the photograph of FIG. 6).

According to the present invention, so as to satisfy light transmission as well as light diffusivity, and also achieve mass production and suitability for an advertisement fixture, the cover plate 30 has bubble inclusion rate of 5%~35% and includes bubbles having a size within the range of 60 μm~700 μm.

As described above, when the size of a bubble 31 is over 700 μm, the light source is faintly observed by naked eyes so that the function of the cover plate as a cover of a lighting fixture remarkably deteriorates. Meanwhile, when the size of a bubble 31 is smaller than 60 μm, it is impossible to achieve mass production thereof.

Hereinafter, Table 1 shows a result of an experiment which is performed by using cover plates formed in the process below. Polyethylene terephthalate (PEP) resin is inserted into the carbonic acid gas at a supercritical pressure state, and the pressure is dropped so as to generate nuclei of bubbles. The generated nuclei of bubbles are foamed at a high temperature (100° C.) and cooled so as to form a cover plate. An light source used in the experiment is a light plate exiting light emitted from a plurality of LEDs at an average illuminance of 2580 lux. Cover plates, which include bubbles having an average size (diameter) of approximate 300 μm, and have each different bubble inclusion rate, are disposed on an upper side of an emitting surface of the light plate one by one. Then, intensity of illumination, transmissivity, and diffusivity of light emitted through each cover plate are measured.

TABLE 1

| light source | LED light plate |
| --- | --- |
| | (average illuminance: 2580 lux) |

TABLE 1-continued

| average size of bubbles | 300 μm | | | |
|---|---|---|---|---|
| bubble inclusion rate | Under 5% | 5~20% | 20~35% | over 35% |
| intensity of illumination (lux) | 2,310 | 2,220 | 1,980 | 1,370 |
| light transmissivity (%) | 89.5 | 86.0 | 76.7 | 53.1 |
| light diffusivity | low | good | good | good |
| possible to be employed in a lighting fixture | impossible | possible | possible | impossible |

As shown in Table 1, in a case where the bubble inclusion rate of the cover plate 30 is within 5~20%, and 20~35%, cover plates have a superior illuminance of 2,220 lux and 1,980 lux, respectively, and have a remarkably superior light transmissivity within 86.0% and 76.7%, respectively, in comparison with a conventional cover plate having a light transmissivity within 50%.

However, in a case where the bubble inclusion rate of the cover plate 30 exceeds 35%, light diffusivity is very high, but light transmissivity decreases so that illuminance remarkably decreases to 1370 lux. Therefore, the cover plate 30 is unsuitable to be employed in a lighting fixture.

Also, in a case where the bubble inclusion rate of the cover plate 30 is less than 5%, since distances between bubbles are big, the amount of light directly transmitted is excessive so that light transmissivity is high, but light diffusivity remarkably decreases. Therefore, in this case, the cover plate is insufficient in achieving light diffusion so that it is unsuitable to be employed in a lighting fixture.

Therefore, so as to employ the cover plate according to the present invention as a lighting fixture in a billboard, etc., bubble inclusion rate thereof has to be within the range of 5%~35%, and the size of a bubble has to be approximately 60~700 μm.

As such, the cover plate 30 according to the present invention has remarkably superior light transmissivity and superior illuminance in comparison with a conventional cover plate for a lighting fixture having no bubbles or typical light plate for a liquid crystal display.

Also, the conventional cover plate has a low light transmissivity, within approximately 50%, so that illuminance thereof is low. Also, since the conventional cover plate uses inorganic particles such as oxytitanium, etc., the manufacturing cost thereof is high. Therefore, the conventional cover plate is unsuitable as a cover for a large-size advertisement board or a lighting lamp.

However, the cover plate according to the present invention provides superior light diffusivity and light transmission due to bubbles 31, and has an advantage in mass production because of the reduced weight thereof and low manufacturing cost.

Meanwhile, the average size (diameter) of bubbles 31 formed at the cover plate 30 can increase or decrease from a light incident surface toward a light emitting surface. For example, bubbles 31 arranged at a side adjacent to the light incident surface of the cover plate 30 can have a size smaller than that of bubbles arranged at a side adjacent to the light emitting surface. In this case, the bubbles 31 of the cover plate 31 can be observed by naked eyes, and when light is provided from the light source, light progressing toward a front part of the cover plate is easily transmitted while meeting a large-sized bubble 31, so that superior illuminance can be provided.

When the average size of bubbles 31 arranged at the front part of the cover plate 30 and the average size of bubbles arranged at the rear part thereof are different from each other, transmission is further improved while diffusivity is kept.

Figure 7:
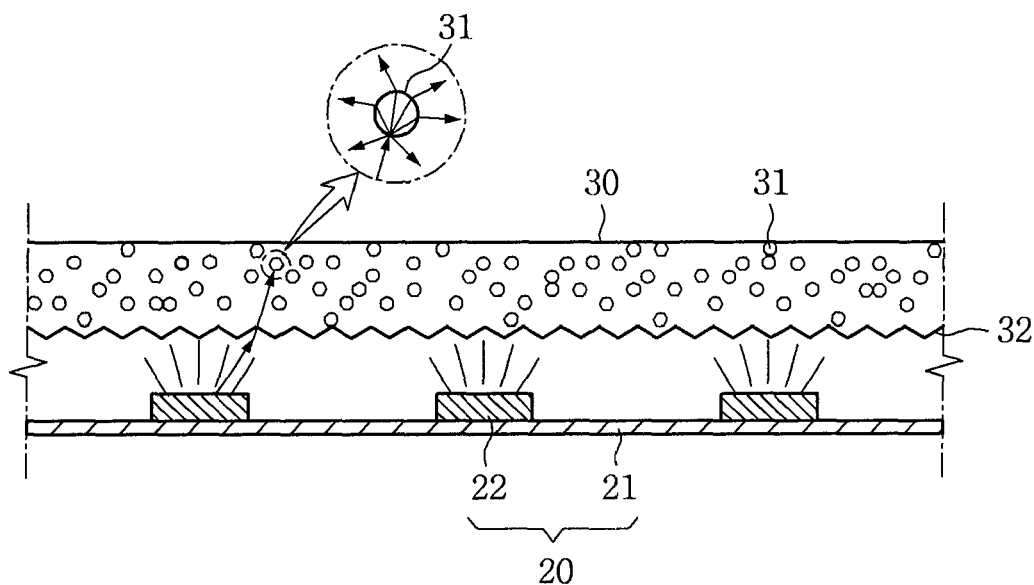
FIG. 7 is a view illustrating a cover plate according to the second embodiment of the present invention, similarly to FIG. 3.
Figure 8:
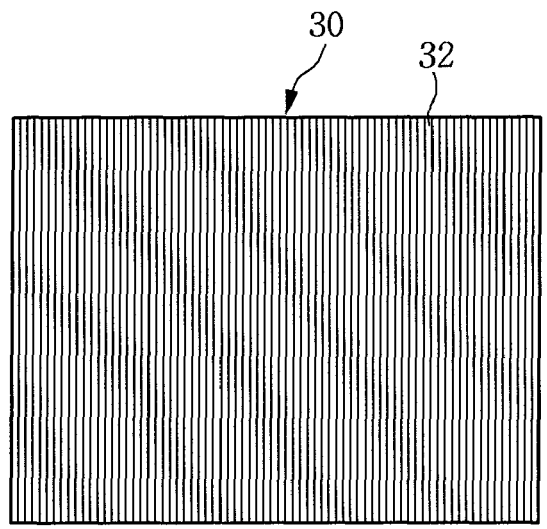
FIG. 8 is a rear view illustrating a pattern formed on the cover plate as shown in FIG. 7, according to one embodiment.
Figure 9:
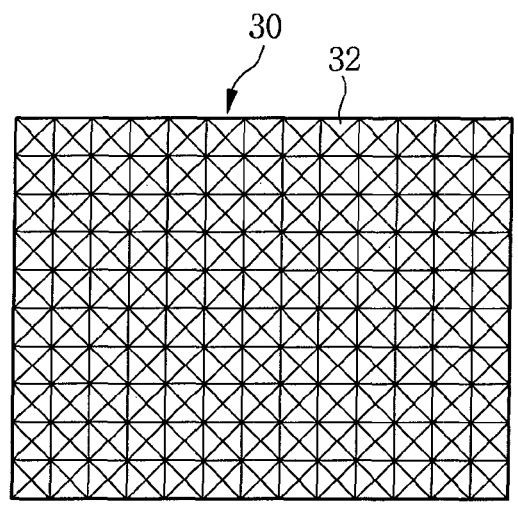
FIG. 9 is a rear view illustrating a pattern formed on the cover plate as shown in FIG. 7, according to another embodiment.

FIG. 7 illustrates a cover plate according to another embodiment of the present invention. The cover plate 30 according to the second embodiment has a structure where a pattern 32 having a polygonal (a triangular shape in this embodiment) prominence-depression shape is successively formed at a light incident surface facing an light source 20. Such a pattern 32 may be a longish prism-pattern as shown in FIG. 8, or may be various other patterns, such as an embossing pattern of a polypyramid-shape or a hemisphere-shape.

The pattern 32 of the cover plate 30 increases a light receiving area so as to increase the amount of incident light and decreases reflexibility. Particularly, the cover plate 30 according to the second embodiment has a larger light receiving area due to the pattern 32 in comparison with a cover plate having a simple plane so that the area where light emitted from the light source 20 makes contact with light incident surface is larger. Accordingly, the amount of incident light increases, thereby further improving luminance.

Figure 10:
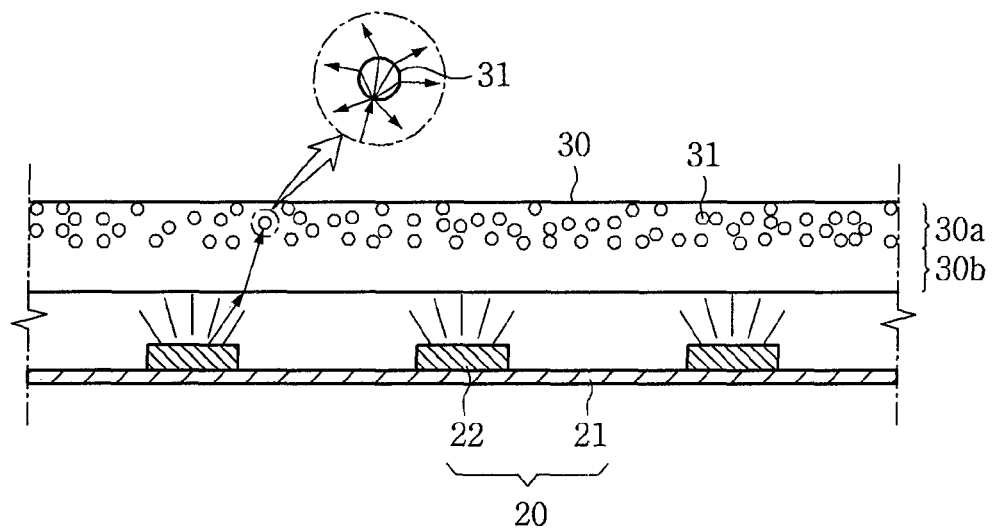
FIG. 10 is a view illustrating a cover plate according to the third embodiment of the present invention, similarly to FIG. 3.

FIG. 10 illustrates a cover plate according to the third embodiment of the present invention. The cover plate 30 according to the third embodiment has a dual-layer structure including a bubble layer 30a and a light transmission layer 30b. The bubble layer 30a has a predetermined thickness and includes countless bubbles 31 used for scattering light at the interior thereof, and the light transmission layer 30b, which is transparent and has a predetermined thickness, is integrally formed at a rear surface of the bubble layer 30a without an interfacial surface. Therefore, there is an advantage in that a decrease in light transmissivity can be minimized in spite of an increase in the thickness of the cover plate.

As described above, bubbles 31 formed at the interior of the cover plate 30 scatter and refract light, thereby increasing light diffusivity, and although the cover plate 30 has light transmission, a certain loss of light is caused in comparison with a cover plate having an empty interior thereof in a transparent state.

Therefore, when the size of an advertisement fixture is larger and the size of the cover plate is also larger, the thickness of the cover plate increases together with the above increase so as to secure the own strength of the cover plate. As such, when the thickness of the cover plate 30 increases, the number of bubbles increases as much as the increase of the thickness thereof so that the light transmissivity decreases at a certain degree.

According to the third embodiment, when the cover plate 30 has a dual-layer structure including a bubble layer 30a having bubbles 31 and a light transmission layer 30b having an empty interior thereof, although the thickness of the cover plate 30 increases, a decrease in the light transmissivity is minimized while light diffusivity is kept at the same level as the above-described cover plate according to the first embodiment, so that lowering of luminance can be prevented.

At this time, it is preferable that an interfacial surface between the bubble layer 30a and the light transmission layer 30b does not exist. To achieve this, the transmission layer 30b and the bubble layer 30a are formed by the same synthetic resin, and the light transmission layer 30b and the bubble layer 30a are formed by a scheme where synthetic resin including bubbles 31 and synthetic resin including no bubbles 31 are stacked on each other in a paste state so as to integrally adhere to each other.

Also, the thickness of the light transmission layer 30b can be two times or three times as much as the thickness of the bubble layer 30a, and according to the whole area of the cover plate 30 and a luminance level to be achieved, etc., the thickness of the bubble layer 30a and the light transmission layer 30b can be freely varied.

Figure 11:
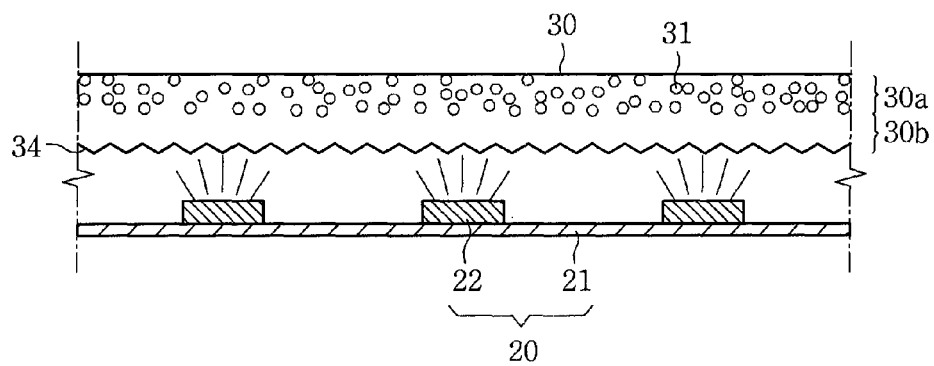
FIG. 11 is a view illustrating a modified cover plate according to the third embodiment as shown in FIG. 10.

As shown in FIG. 11, the cover plate 30 according to the third embodiment may also has a pattern 34 formed at a light incident surface thereof so as to increase a light receiving area, similarly to the cover plate 30 according to the second embodiment.

The function of the pattern 34 is the same as the pattern 32 (refers to FIG. 4) of the above-described cover plate 30 according to the second embodiment. Therefore, the description about the function will be omitted.

Meanwhile, although patterns 32 and 34 for increasing a light receiving area are formed at each light incident surface of the cover plates 30 in the above described embodiments, predetermined patterns (not shown) for suppressing total internal reflection may be also formed at a light emitting surface from which light is emitted.

Figure 12:
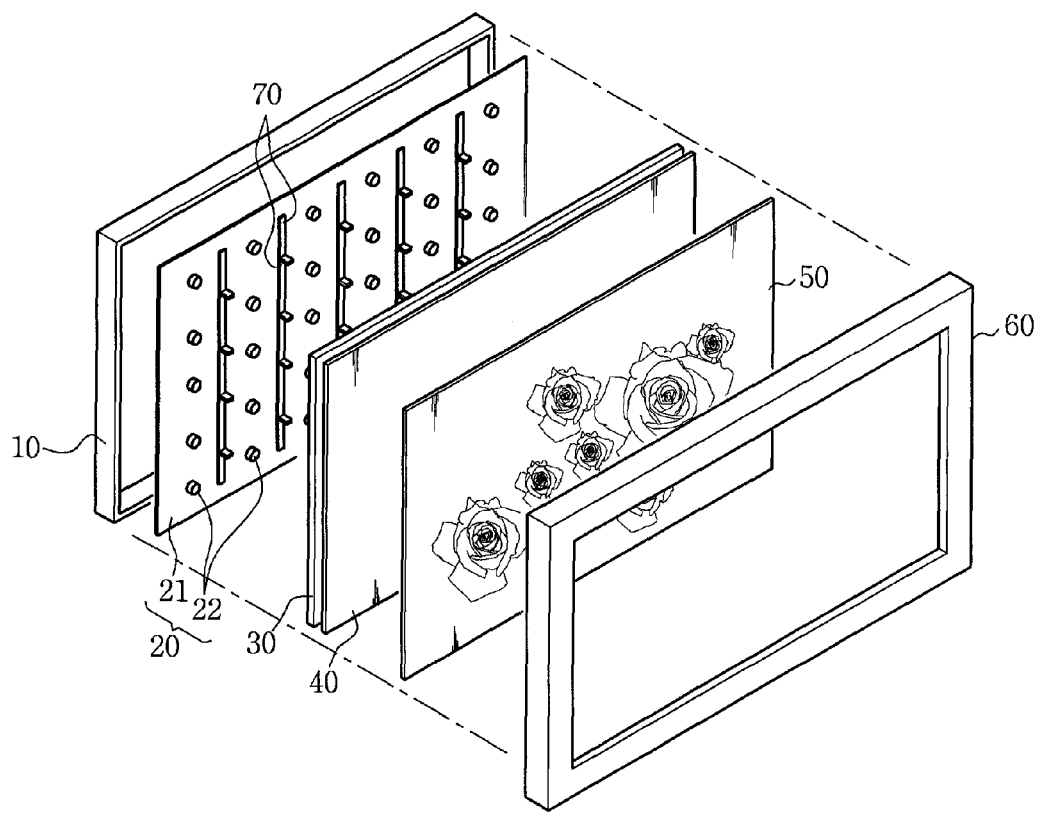
FIG. 12 is an exploded perspective view illustrating an advertisement fixture employing a cover plate for a lighting fixture according to another embodiment of the present invention.
Figure 13:
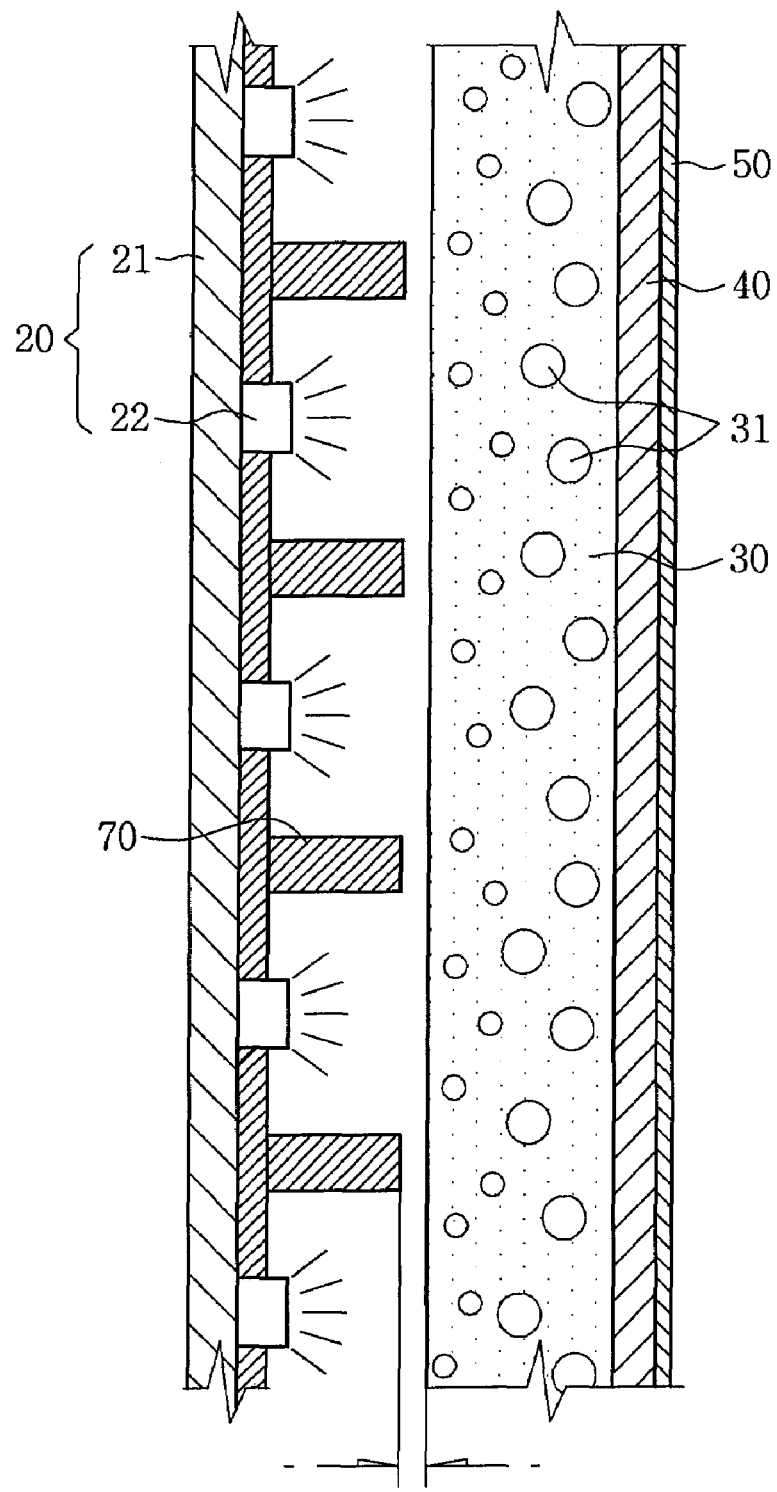
FIG. 13 is a sectional view illustrating a main part of the advertisement fixture as shown in FIG. 12.

FIGS. 12 and 13 illustrate a cover plate 30 applied to an advertisement fixture according to another embodiment. In the advertisement fixture according to this embodiment, a resin plate 40 for secondary diffusion and an advertisement sheet 50 containing advertisement content are stacked at a front part of the cover plate 30 one by one, and a fixing chassis 60 of a square-shape, which is used to fix the resin plate 40 for secondary diffusion and the advertisement sheet 50 respective to the case 10, is assembled with the front part of the case 10.

Supporting members 70, which suppress warping or vibration, etc. cased by an increase of the size of the cover plate by supporting the cover plate 30 respective to the case 10, may be separately installed at the interior of the case 10.

Although the resin plate 40 for secondary diffusion is preferably made in a white color, the resin plate can have another color, such as yellow, etc., and is also made from resin material having a characteristic of light transmission, such as acryl. Also, it is preferable that the resin plate 40 for secondary diffusion is formed separately from the cover plate 30. Meanwhile, the resin plate 40 can be also formed integrally with the cover plate 30 through a double injection forming process, etc.

When the end part of the supporting member 70 makes complete contact with the cover plate 30, light diffusion does not completely performed at an area where the supporting member 70 makes contact with the cover plate 30 so that a shadow can be observed at this area by an outer observer.

Therefore, it is preferable that a front part of the supporting member 70 is spaced a little from a rear surface of the cover plate 30.

Also, according to the above-described embodiments, although the cover plate according to the present invention is employed in an advertisement fixture such as a billboard, the cover plate for a lighting fixture according to the present invention may also be employed in a cover of a lighting fixture such as a cover of fluorescent lamp or a cover of a stand, or in a case of a specific shape having an light source in the interior thereof, e.g. a case of a fixture for an interior design having an artistic configuration, such as a human or an animal, etc.

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The cover plate for a lighting fixture according to the present invention can be employed in various lighting fixtures requiring illumination, such as an advertisement fixture, e.g. a billboard, an interior lighting, a lighting fixture for an interior design, etc.

The invention claimed is:

1. A cover plate for a lighting fixture disposed about a light source, comprising:
   at least one light transmissive layer made of a resin material, having an inner surface proximate the light source, and an outer surface;
   wherein said at least one light transmissive layer comprises a plurality of bubbles;
   the bubbles having diameters within a range of 60 um to 700 um, and a bubble inclusion rate in the at least one light transmissive layer of 5-35% by volume; and
   wherein the at least one light transmissive layer diffuses, refracts, and transmits light emitted from the light source through the entire outer surface.

2. The cover plate for a light fixture as claimed in claim 1, wherein the diameter of the bubbles varies between the inner surface and the outer surface.

3. The cover plate for a lighting fixture as claimed in claim 1, wherein a pattern having a predetermined prominence-depression shape is formed at the inner surface.

4. The cover plate for a lighting fixture as claimed in claim 3, wherein the pattern has a prism-shape, a polypyramid shape, or an embossing shape, and is successively formed on the inner surface in its entirety.

5. The cover plate for a lighting fixture as claimed in claim 1, further comprising:
   a second light transmissive layer having no bubbles, the second light transmissive layer being integrally formed on one surface of the at least one light transmissive layer without an interfacial interface.

6. The cover plate for a lighting fixture as claimed in claim 5, wherein a pattern of a predetermined prominence-depression shape is successively formed at an outer surface of the second light transmissive layer.

7. The cover plate for a lighting fixture as claimed in claim 5, wherein the second light transmissive layer is made of the resin material used in the at least one light transmissive layer and adheres to one surface of the at least one light transmissive layer by being stacked on the one surface of the at least one light transmissive layer.

8. A lighting fixture comprising:
   a case;
   a light source installed within the case; and
   a cover plate adjacent to the light source, the cover plate comprising:
   at least one light transmissive layer made of a resin material, having an inner surface proximate the light source, and an outer surface;
   wherein said at least one light transmissive layer comprises a plurality of bubbles having a bubble inclusion rate of 5-35% of bubbles by volume, and diameters within a range of 60 -700 um, for light scattering so that the cover plate transmits, refracts, and diffuses light emitted from the light source through a whole surface of the cover plate.

9. The lighting fixture as claimed in claim 8, further comprising a supporting member installed at an interior of the case so as to support a rear surface of the cover plate so that the cover plate is prevented from getting bent toward the light source.

10. The lighting fixture as claimed in claim 8, further comprising a second light transmissive layer for secondary diffusion installed at the inner surface or the outer surface of the at least one light transmissive layer the second light transmissive layer being made of the resin material.

11. The lighting fixture as claimed in claim 8, wherein a pattern having a prominence-depression shape is formed at the inner surface of the at least one light transmissive layer.

12. The lighting fixture as claimed in claim 8, further comprising:
a second light transmissive layer having no bubbles that is integrally formed on one surface of the at least one light transmissive layer without an interfacial surface.

* * * * *